US010599927B2

(12) United States Patent
Zhong et al.

(10) Patent No.: US 10,599,927 B2
(45) Date of Patent: *Mar. 24, 2020

(54) GENERATING PIXEL MAPS FROM NON-IMAGE DATA AND DIFFERENCE METRICS FOR PIXEL MAPS

(71) Applicant: The Climate Corporation, San Francisco, CA (US)

(72) Inventors: Hao Zhong, Menlo Park, CA (US); Ying Xu, Brookline, MA (US)

(73) Assignee: The Climate Corporation, San Francisco, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/831,269

(22) Filed: Dec. 4, 2017

(65) Prior Publication Data

US 2018/0101728 A1 Apr. 12, 2018

Related U.S. Application Data

(63) Continuation of application No. 15/209,628, filed on Jul. 13, 2016, now Pat. No. 9,881,214.

(51) Int. Cl.
*G06K 9/00* (2006.01)
*G06K 9/62* (2006.01)
*G06K 9/42* (2006.01)

(52) U.S. Cl.
CPC ....... *G06K 9/00657* (2013.01); *G06K 9/6215* (2013.01); *G06K 9/42* (2013.01)

(58) Field of Classification Search
None
See application file for complete search history.

(56) References Cited

U.S. PATENT DOCUMENTS

| 4,653,013 A | * | 3/1987 | Collins | ................. G06T 3/4007 |
| | | | | 345/667 |
| 2005/0234691 A1 | * | 10/2005 | Singh | ..................... G06Q 10/04 |
| | | | | 703/11 |

(Continued)

OTHER PUBLICATIONS

The International Bureau of WIPO, "Preliminary Report on Patentability" in application No. PCT/US2017/041489, dated Jan. 15, 2019, 19 paegs.
Current Claims in application No. PCT/US2017/041489, dated Jan. 2019, 8 pages.
Wang et al., "On the Euclidean Distance of Images", IEEE, dated Jun. 13, 2005, 12 pages.
Wang et al., "Image Quality Assessment: From Error Visibility to Structural Similarity", IEEE Transactions on Image Processing vol. 13 No. 4, dated Apr. 4, 2004, 14 pages.

(Continued)

*Primary Examiner* — Delomia L Gilliard
(74) *Attorney, Agent, or Firm* — Elliot H. Karlin; Hickman Palermo Becker Bingham LLP

(57) ABSTRACT

Systems and methods for scalable comparisons between two pixel maps are provided. In an embodiment, an agricultural intelligence computer system generates pixel maps from non-image data by transforming a plurality of values and location values into pixel values and pixel locations. The non-image data may include data relating to a particular agricultural field, such as nutrient content in the soil, pH values, soil moisture, elevation, temperature, and/or measured crop yields. The agricultural intelligence computer system converts each pixel map into a vector of values. The agricultural intelligence computer system also generates a matrix of metric coefficients where each value in the matrix of metric coefficients is computed using a spatial distance between to pixel locations in one of the pixel maps. Using the vectors of values and the matrix of metric coefficients, the agricultural intelligence computer system generates a (Continued)

difference metric identifying a difference between the two pixel maps. In an embodiment, the difference metric is normalized so that the difference metric is scalable to pixel maps of different sizes. The difference metric may then be used to select particular images that best match a measured yield, identify relationships between field values and measured crop yields, identify and/or select management zones, investigate management practices, and/or strengthen agronomic models of predicted yield.

22 Claims, 9 Drawing Sheets

(56) References Cited

U.S. PATENT DOCUMENTS

| | | | | |
|---|---|---|---|---|
| 2007/0089390 | A1* | 4/2007 | Hendrickson | A01B 69/008 56/10.2 F |
| 2011/0166788 | A1 | 7/2011 | Griffin | |
| 2015/0131891 | A1* | 5/2015 | Kim | G06T 7/001 382/144 |
| 2016/0050840 | A1* | 2/2016 | Sauder | A01B 79/005 701/3 |
| 2016/0223506 | A1* | 8/2016 | Shriver | G01N 33/0098 |
| 2017/0161560 | A1 | 6/2017 | Izhaky | |
| 2018/0018517 | A1 | 1/2018 | Zhong | |

OTHER PUBLICATIONS

Turk et al., "Face Recognition Using Eigenfaces", IEEE, dated 1991, 6 pages.

Simard et al., "Efficient Pattern Recognition Using a New Transformation Distance", dated 1993, 9 pages.

Russakoff et al., "Image Similarity Using Mutual Information of Regions", ECCV, dated 2004, LNCS, 12 pages.

Maes et al., "Multi-modality Image Registration By Maximization of Mutual Information", dated 1997, 9 pages.

Liu et al., "Understanding of Internal Clustering Validation Measures", dated 2010 IEEE International Conference on Data Mining, 6 pages.

Interpreting Spatial Patterns a Guided Analysis of the World At Night, last viewed on Oct. 11, 2016, 2 pages.

Dalal et al., "Histograms of Oriented Gradients for Human Detection", 2005 IEEE Computer Society Conference on Computer, 8 pages.

Zhong, U.S. Appl. No. 15/209,628, filed Jul. 13, 2016, Notice of Allowance, dated Sep. 6, 2017.

* cited by examiner

Fig. 2
(a)
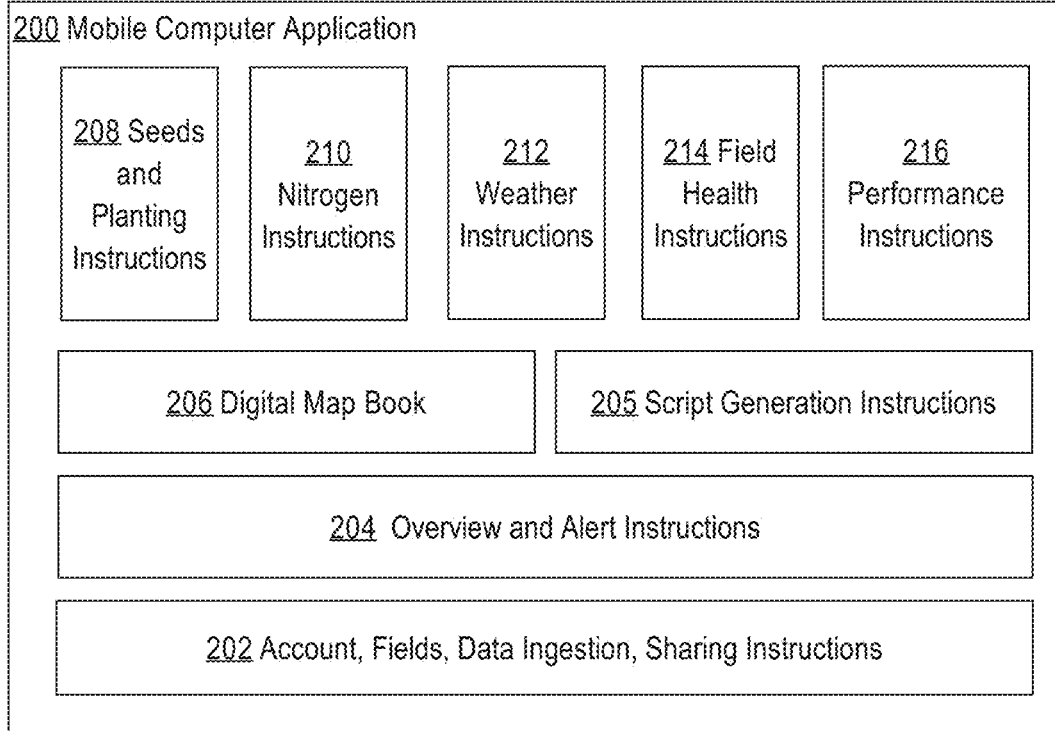
(b)
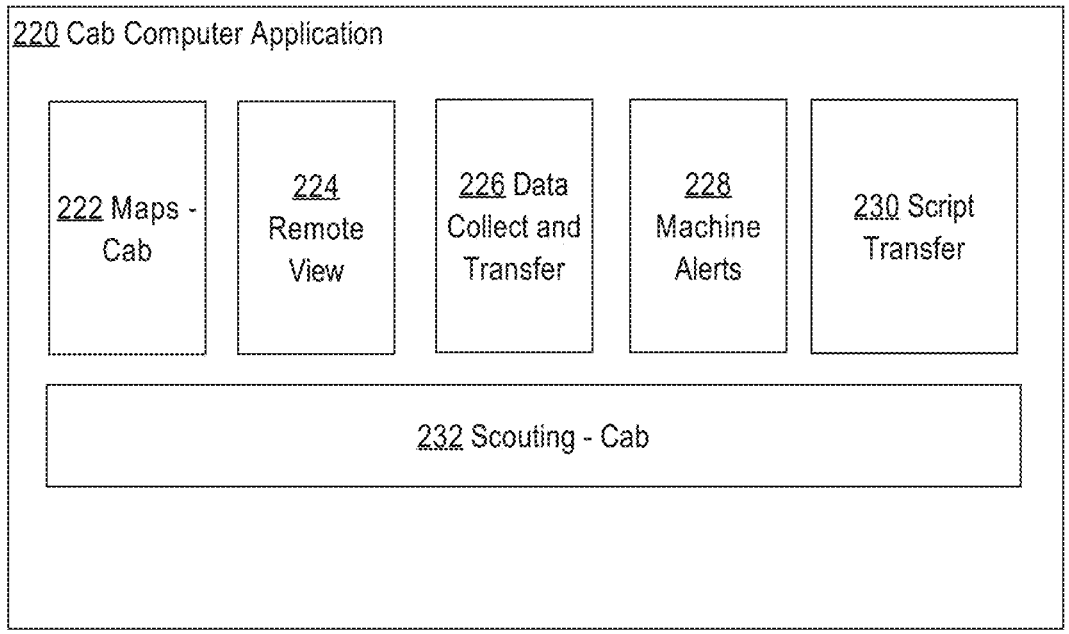

FIG. 6

Data Manager

Nitrogen | Planting | Practices | Soil

| Planting 1(4 Fields) | Planting 2(0 Fields) | Planting 3(0 Fields) | Planting 4(1 Fields) | Add New Planting Plan |
|---|---|---|---|---|
| Crop Corn Product | Crop Corn Product | Crop Corn Product | Crop Corn Product | |
| Plant Date: 2016-04-12 | Plant Date: 2016-04-15 | Plant Date: 2016-04-13 | Plant Date: 2016-04-13 | + |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | --- | DMC82-M | 112 | 160 | 34000 | Apr |
| ☐ Austin, MN 1<br>Corn \| 100 \| Fredricks, MN | Corn | --- | DMC82-M | 114 | 160 | 36000 | Apr |
| ☐ Boone, IN 1<br>Corn \| 100 \| Boone, IA | Corn | --- | DMC82-M | 112 | 150 | 34000 | Apr |
| ☐ Champaign 1<br>Corn \| 100 \| Champaign, IL | Corn | --- | --- | 112 | 200 | 34000 | Apr |
| ☐ E Nebraska 1<br>Corn \| 100 \| Burt, NE | Corn | --- | --- | 112 | 160 | 34000 | Apr |

GENERATING PIXEL MAPS FROM NON-IMAGE DATA AND DIFFERENCE METRICS FOR PIXEL MAPS

BENEFIT CLAIM

This application claims the benefit under 35 U.S.C. § 120 as a continuation of application Ser. No. 15/209,628, filed Jul. 13, 2016, the entire disclosure of which is hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2017 The Climate Corporation.

FIELD OF THE DISCLOSURE

The present disclosure relates to computer systems useful in climatology and agricultural. The disclosure relates more specifically to computer systems that are programmed or configured to generate pixel maps and difference metrics between two pixel maps which maintain spatial relationships within the pixel maps and are scalable to pixel maps of various sizes and shapes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In agricultural modeling, it is often useful to compare various location based values with corresponding values at the locations. For example, predictions of yield may be generated for a plurality of sections of a field using agronomic modeling techniques. Comparing the predictions to measured yields may be useful for identifying errors in an agronomic model or for selecting agronomic models that led to more accurate predictions. Other examples of comparisons include comparisons of field related values, such as nutrient content in the soil, pH values, soil moisture, elevation, and temperature to measured yields.

Additionally, it is often useful to compare values across a plurality of years. For example, comparisons between measurements of yield over a plurality of years may be useful to determine consistency within a field which in turn may then inform management practices of the field. It is also useful to identify consistent spatial patterns within a field in order to identify portions of the field which act differently or produce different yields.

Conventional similarity metrics are based on differences of each value at each location. By comparing values individually, the conventional similarity metrics fail to take into account spatial relationships. For example, if each value shifted in one direction, a visual representation of the two sets of values would appear obviously similar while conventional metrics would treat the two data sets as extremely dissimilar.

The failure to account for spatial relationships is a shortcoming of metrics designed to compare sets of data. Spatial relationships can be extremely important in determining consistency of particular values or identifying correlations between particular values. Yet, given that data sets are treated as comprising discrete and independent data values, spatial relationships between nearby locations remain unaccounted for. Additionally, given the absence of spatial relationships, a comparison of individual data points to portions of an image, such as satellite images of a field, are unable to recognize the spatial relationships within the image.

Image comparison techniques take into account spatial relationship in two images, but they have their own shortcomings. First, image comparison techniques are generally only applicable to images, particularly images of similar resolution. Second, image comparison techniques tend to not be scalable, thereby limiting their usefulness in comparing similarity or difference metrics between two different sets of images of different sizes or shapes. Generally, two large images will produce a different range of similarity or difference metrics as two small images.

Thus, there is a need for techniques for generating images from discrete data sets, such as measured crop yields, such that two data sets may be compared using image comparison techniques. Additionally, there is a need for image comparison techniques that are scalable such that comparisons of a field of one size and shape can be measured against comparisons of a field of a second size and shape.

SUMMARY

The appended claims may serve as a summary of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
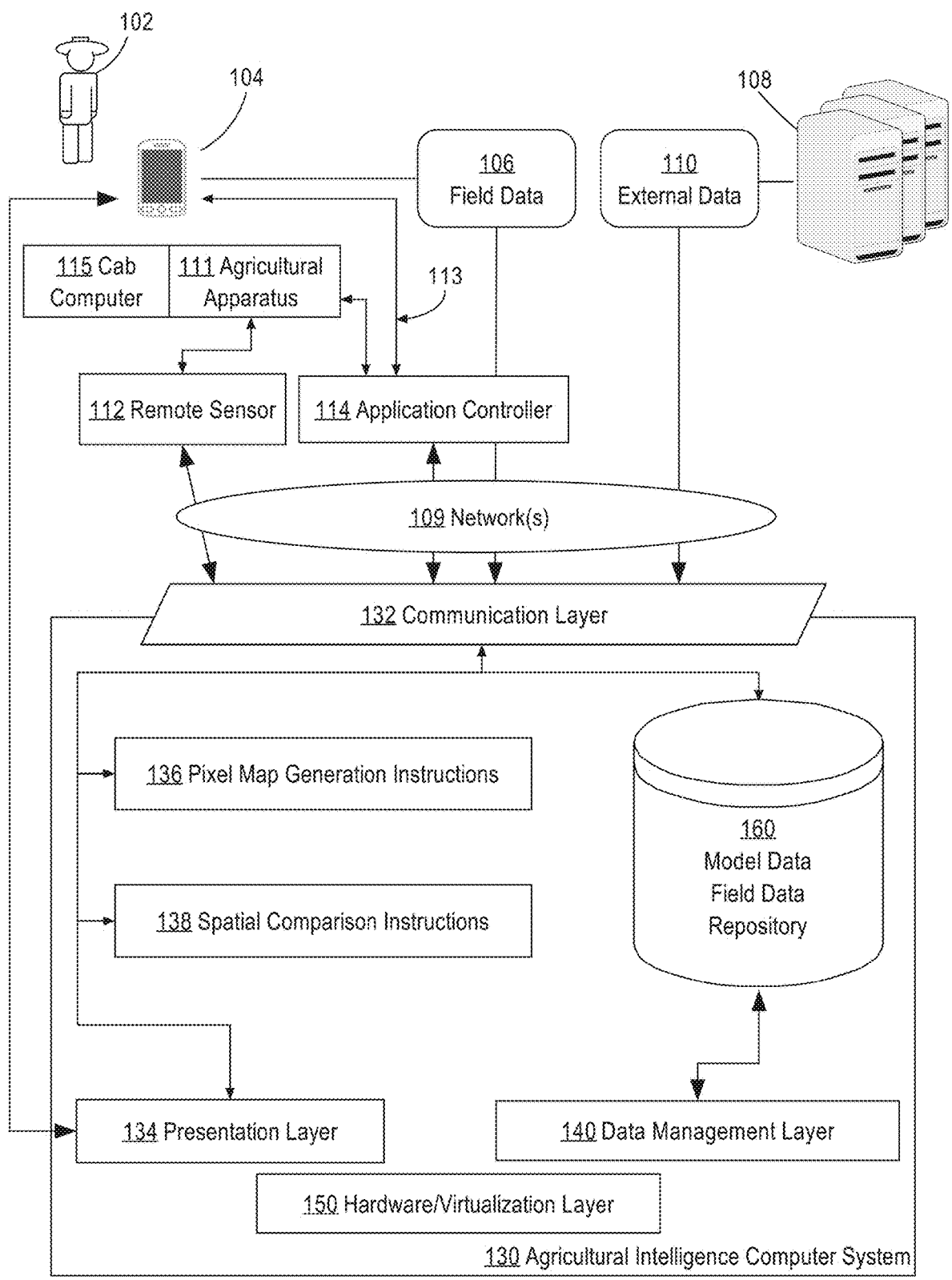
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. SPATIAL PATTERN DIFFERENCE METRICS
3.1 OBTAINING PIXEL MAPS
3.2. GENERATING PIXEL MAPS
3.3. PIXEL MAP SPATIAL RESOLUTION
3.4. DIFFERENCE METRICS
3.5. NORMALIZED DIFFERENCE METRICS
3.6. DIFFERENCE METRIC USAGE
   3.6.1. SELECTING IMAGES
   3.6.2. COMPARISONS TO MEASURED YIELD
   3.6.3. SELECTING MODELS
   3.6.4. YIELD CONSISTENCY
   3.6.5. RECOMMENDATIONS AND APPLICATION CONTROLLER INSTRUCTIONS
   3.6.6. SELECTING MANAGEMENT ZONES
   3.6.7. INVESTIGATE MANAGEMENT PRACTICES
4. BENEFITS OF CERTAIN EMBODIMENTS
5. EXTENSIONS AND ALTERNATIVES

1. General Overview

Aspects of the disclosure generally relate to computer-implemented techniques for generating difference metrics to compare pixel maps in order to strengthen agronomic modeling of crop yield. In an embodiment, an agricultural intelligence computer system generates pixel maps from non-image data by transforming a plurality of values and location values into pixel values and pixel locations. The agricultural intelligence computer system converts each pixel map into a vector of values. The agricultural intelligence computer system also generates a matrix of metric coefficients where each value in the matrix of metric coefficients is computed using a spatial distance between two pixel locations in one of the pixel maps. Using the vectors of values and the matrix of metric coefficients, the agricultural intelligence computer system generates a difference metric identifying a difference between the two pixel maps. In an embodiment, the difference metric is normalized so that the difference metric is scalable to pixel maps of different sizes. The difference metric may then be used to select particular images that best match a measured yield, identify relationships between field values and measured crop yields, identify and/or select management zones, investigate management practices, and/or strengthen agronomic models of predicted yield.

In an embodiment, a method comprises obtaining a first pixel map for a predicted agronomic yield of a particular field wherein each pixel of the first pixel map represents an agronomic yield of a crop at a physical location within the particular field; obtaining a second pixel map for a measured agronomic yield of the particular field wherein each pixel of the second pixel map represents an agronomic yield of a crop at a physical location within the particular field; generating, from the first pixel map, a first vector of values; generating, from the second pixel map, a second vector of values; generating a matrix of metric coefficients wherein each row of the matrix of metric coefficients corresponds to a first pixel location of the first pixel map, each column of the matrix of metric coefficients corresponds to a second pixel location of the first pixel map, and each value in the matrix of metric coefficients is computed using a spatial distance between the first pixel location and the second pixel location for the value; generating a particular difference metric that specifies a difference between the first pixel map and the second pixel map based on the first vector of values, the second vector of values, and the matrix of metric coefficients; computing, from the particular difference metric, a particular normalized difference metric comprising a quotient of the difference metric with a sum of the metric coefficients in the matrix of metric coefficients; generating and sending, to a field manager computing device, one or more field management recommendations based, at least in part, on the particular normalized difference metric.

In an embodiment, a method comprises obtaining a first pixel map for a first physical property at a plurality of locations in a particular region; obtaining a second pixel map for a second physical property at the plurality of locations in a particular region, wherein the second pixel map is an equal size as the first pixel map; generating, from the first pixel map, a first vector of values; generating, from the second pixel map, a second vector of values; generating a matrix of metric coefficients wherein each row of the matrix of metric coefficients corresponds to a first pixel location of the first pixel map and each column of the matrix of metric coefficients corresponds to a second pixel location of the first pixel map and each value in the matrix of metric coefficients is computed using a spatial distance between the first pixel location and the second pixel location for the value; generating a difference metric identifying a difference between the first digital data and the second pixel map based on the first vector of values, the second vector of values, and the matrix of metric coefficients.

In an embodiment, a method comprises receiving first digital data comprising yield values for a plurality of locations; receiving a particular image comprising a plurality of image values for the plurality of locations; identifying a first spatial resolution of the yield values; identifying a second spatial resolution of the image values of the particular image; aggregating the yield values and the image values of the particular image to a common grid based, at least in part, on the first spatial resolution and the second spatial resolution; generating a first empirical cumulative distribution function of the yield values; computing a first quantile transformation for the first empirical cumulative distribution function; transforming each yield value to a first normal distribution using the first quantile transformation; generating a first pixel map using the transformed yield values; generating a second empirical cumulative distribution function of the image values of the particular image; computing a second quantile transformation for the second empirical cumulative distribution function; transforming each image value of the particular image to a normal distribution using the second quantile transformation; generating a second pixel map using the transformed image values of the particular image; computing a particular difference metric indicating a difference between the yield values and the particular image using the first pixel map and the second pixel map.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1.

The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
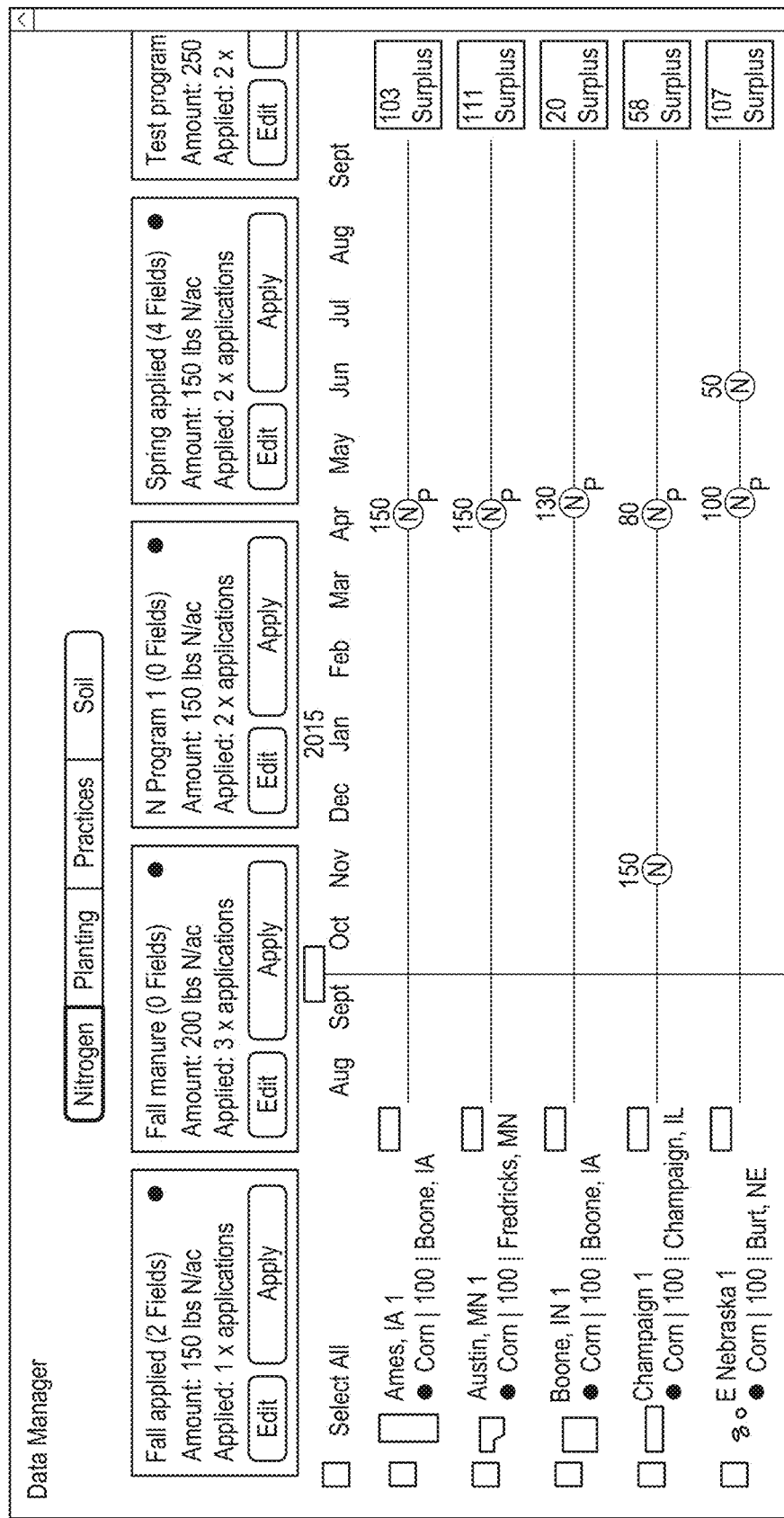
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Pixel map generation instructions 136 comprise computer readable instructions which, when executed by one or more processors, cause agricultural intelligence computer system 130 to perform transformation of image values and non-image values in order to generate pixel maps. Spatial comparison instructions 138 comprise computer readable instructions which, when executed by one or more processors, cause agricultural intelligence computer system 130 to perform computation of difference metrics between two pixel maps of the same size and shape which account for spatial relationships in the pixel maps.

In one embodiment, each of pixel map generation instructions 136 and spatial comparison instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the nutrient modeling instructions 135 may comprise a set of pages in RAM that contain instructions which when executed cause performing the nutrient modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of pixel map generation instructions 136 and spatial comparison instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
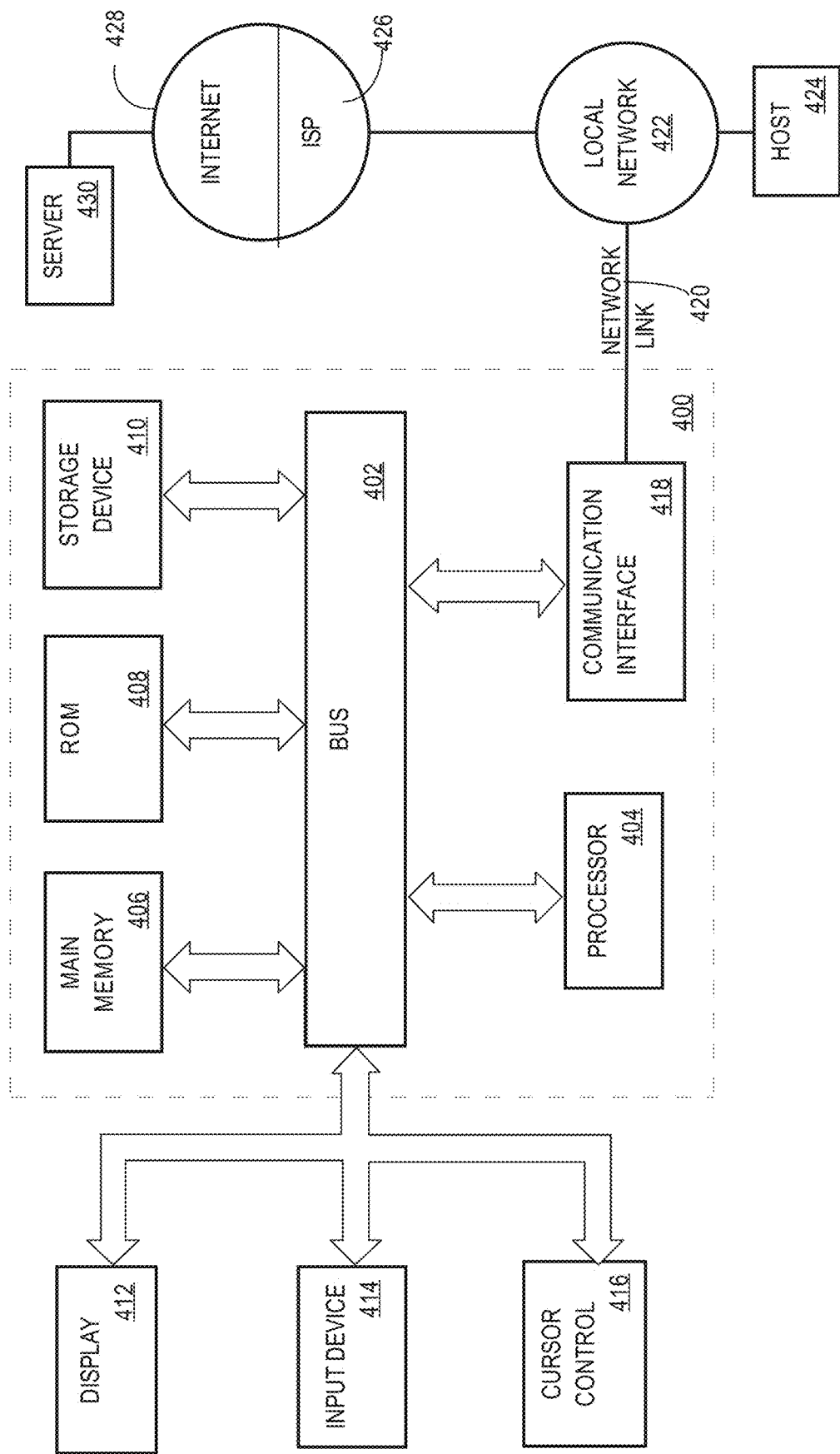
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130.

Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
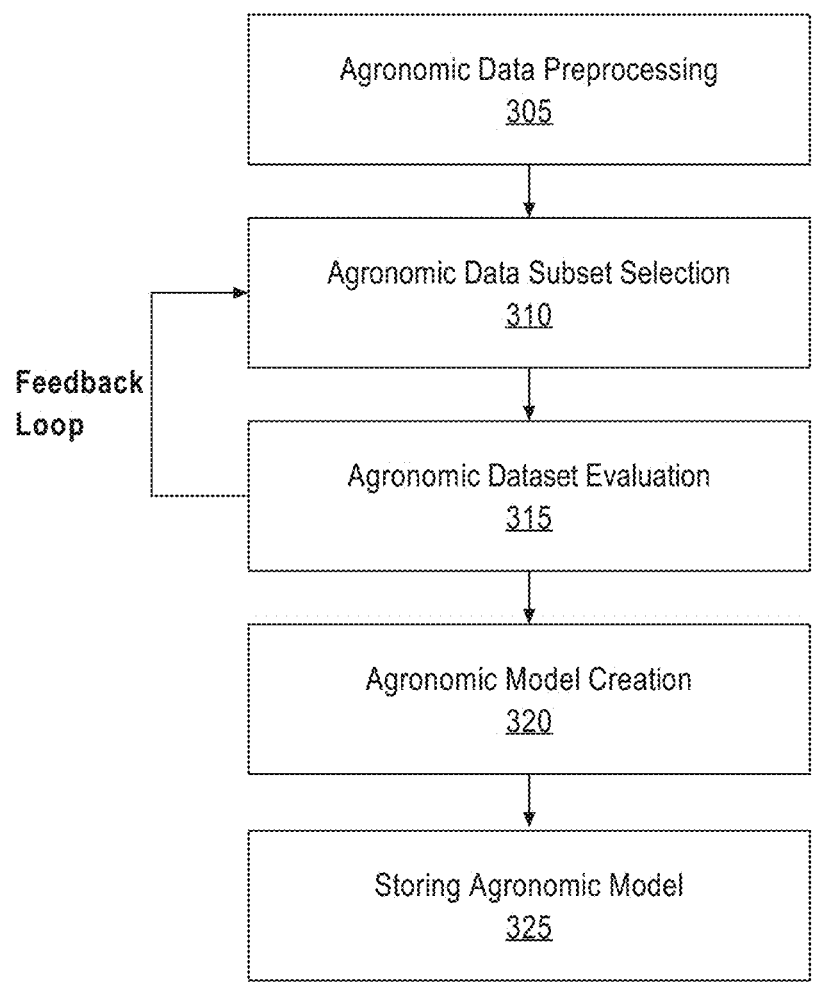
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Spatial Pattern Difference Metrics

Figure 8:
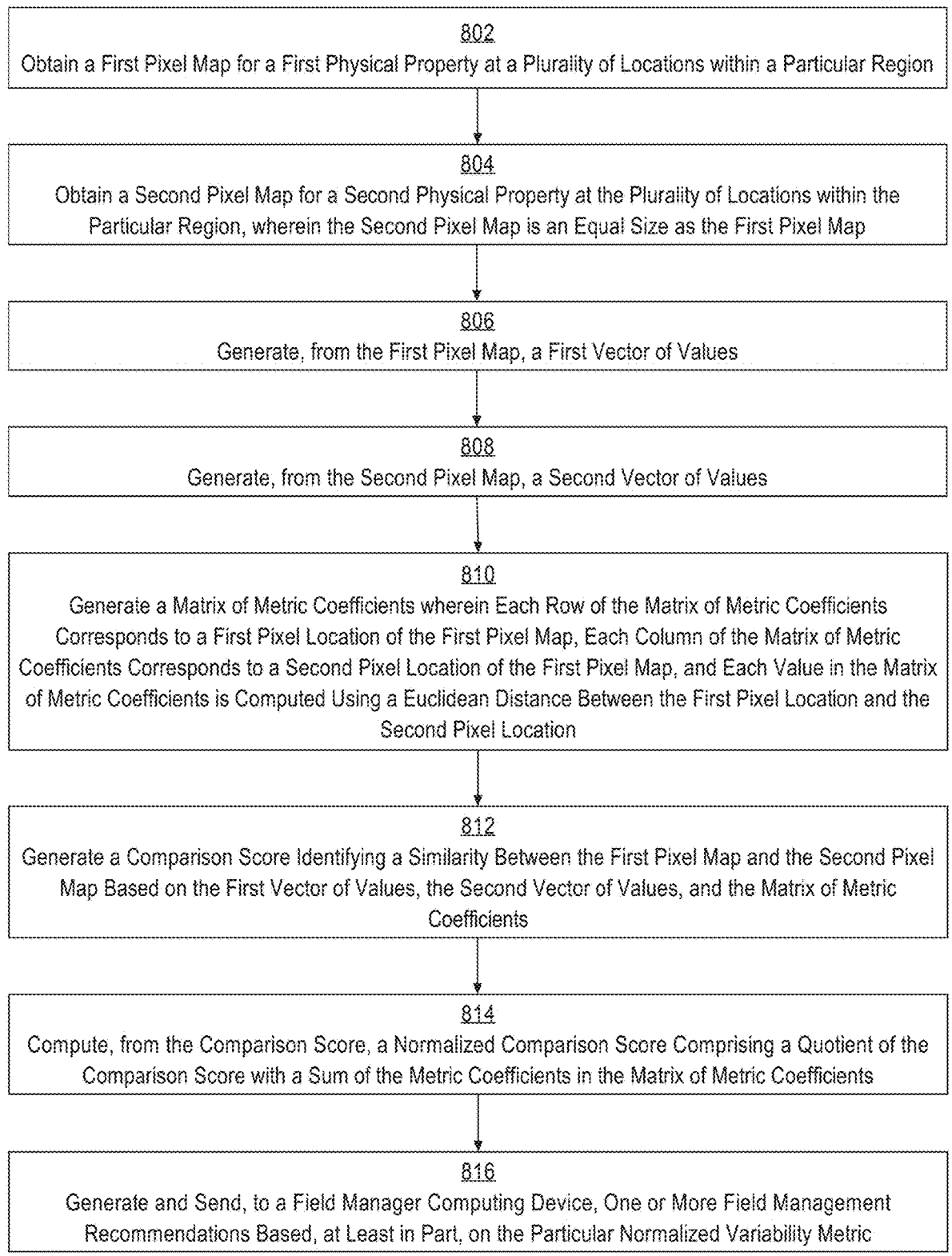
FIG. 8 is a flow diagram that depicts a method for generating a difference metric representing a difference between two sets of physically distributed data points which preserves similarities in spatial patterns.

FIG. 8 is a flow diagram that depicts a method for generating a difference metric representing a difference

3.1 Obtaining Pixel Maps

At step 802, a first pixel map for a first physical property at a plurality of locations within a particular region is obtained. A pixel map, in this context, refers to digitally stored data that can be interpreted or used as the basis of generating a graphical image of a geographical area on a computer display. As an example, a pixel map representing agronomic yield of a crop may comprise a plurality of pixels each of which comprising a location value representing a geographical location on a field and an agronomic yield value representing an agronomic crop yield at the location. The color or shade of the pixel may be derived from the agronomic yield value and displayed on the computer display. As another example, a pixel map may comprise a satellite image of a particular field using one or more particular wavelengths of light.

At step 804, a second pixel map for a second physical property at the plurality of locations within the particular region is obtained in which the second pixel map is an equal size as the first pixel map. In an embodiment, the second physical property at the plurality of locations is the same property as the first physical property. For example, agricultural intelligence computer system 130 may receive yield maps for a particular field for two different years. As another example, a first yield map may correspond to modeled predictions of yield for a particular field while the second yield map corresponds to measurements of yield for the particular field at harvest time.

In an embodiment, the physical properties of the two pixel maps are different. For example, agricultural intelligence computer system 130 may receive a yield map for a particular field and a map of pH values of the soil for the particular field. As another example, agricultural intelligence computer system 130 may receive a yield map for a particular field and a satellite image of the particular field using infrared frequencies.

Equal size, in the context of FIG. 8, refers to the size and shape of the region corresponding to the pixel map. Thus, if a first pixel map corresponds to a physical location which is ten acres, the second pixel map corresponds to a physical location which is ten acres. In an embodiment, agricultural intelligence computer system 130 receives two pixel maps of the same size and shape, such as two yield maps for a particular field for two different years. In other embodiments, obtaining the two pixel maps comprises receiving or obtaining pixel maps of different size and/or shape and editing the pixel maps so that they correspond to the same physical area. For example, agricultural intelligence computer system 130 may receive or obtain a yield map for a particular field and a satellite image of a region including the particular field. Agricultural intelligence computer system 130 may remove portions of the satellite image that do not correspond to the yield map for the particular field.

3.2. Generating Pixel Maps

In an embodiment, obtaining a pixel map comprises receiving digital data corresponding to a plurality of locations with a plurality of values and generating a pixel map from the digital data. For instance, agricultural intelligence computer system 130 may receive measured yield values and location values for a particular field from field manager computing device 104. Agricultural intelligence computer system 130 may then generate a yield map from the measured yield values and the location values.

Figure 7:
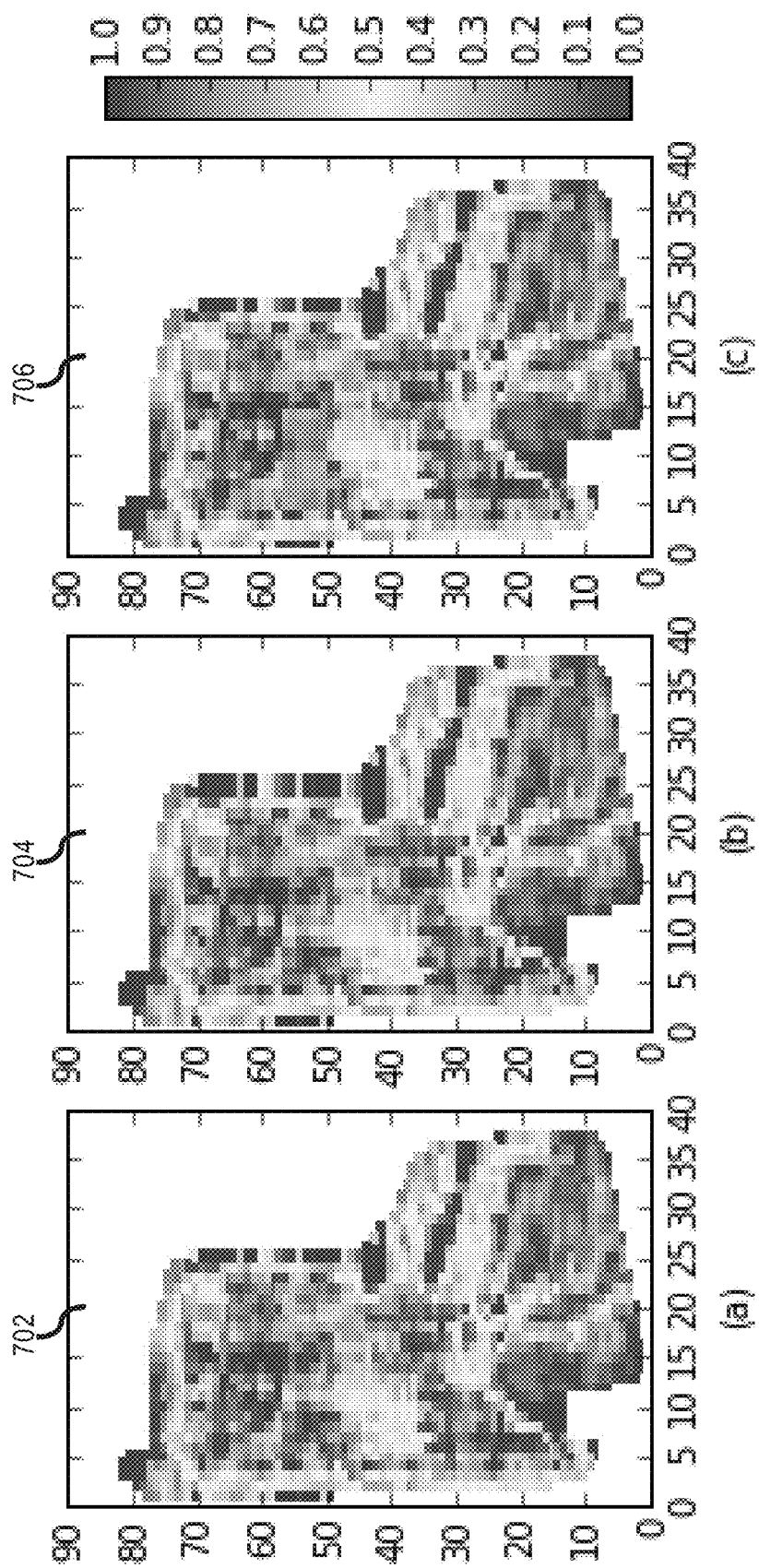
FIG. 7 depicts example yield maps generated from yield values and location values corresponding to a particular field.

FIG. 7 depicts example yield maps generated from yield values and location values corresponding to a particular field. FIG. 7 contains yield map 702, yield map 704, and yield map 706. Each of the yield maps of FIG. 7 is generated to represent crop yields at physical locations across a particular field.

The location of each pixel of the yield maps in FIG. 7 corresponds to a physical location on the particular field. For example, each pixel may represent a ten meter by ten meter region. Locations corresponding to each pixel may be identified through latitude and longitude and then translated to pixel location values where each pixel location value represents a number of pixels between the pixel location and both the side edge and bottom edge of the pixel map. Thus, a pixel with a location value of (6:3) may be six pixels from the left side of the pixel map and three pixels from the bottom of the pixel map. In an example where each pixel represents a ten meter by ten meter region, the pixel with a location value of (6:3) may correspond to a physical location that is 50-60 meters from the lowest longitudinal coordinate of the region depicted by the pixel map and 20-30 meters from the lowest latitudinal coordinate.

The intensity of each pixel of the yield maps in FIG. 7 corresponds to an agronomic yield of a crop at the location of the pixel. For example, agronomic yield may be measured in pounds per acre for each location corresponding to a pixel. The agronomic yield for each location corresponding to a pixel may then be converted to a color or shade for the pixel. In FIG. 7, the pixels range in color from green to red with values between zero and one. The agronomic yields may be converted to match these values, such as by dividing each agronomic yield value by the maximum value of the agronomic yield for the entire field. Additional methods of converting yield values to pixel values may include subtracting each yield value by the minimum measured yield value for the entire field before dividing by the maximum value of the resulting yield values. Alternatively, agricultural intelligence computer system 130 may convert yield values to pixels using more complex methods, such as quantile transformations which are described further herein.

While FIG. 7 depicts a pixel map generated from yield values, pixel maps may also be generated from other values, such as pH value, moisture content, nutrient content in the soil, temperature, and/or wavelengths of refracted light from digital images. Additionally, pixel maps may be generated from difference values, such as absolute values of differences between measured temperature and a predetermined optimal temperature. Thus, a pixel map may represent deviations from optimal values instead of the range of values.

3.3. Pixel Map Spatial Resolution

In an embodiment, obtaining pixel maps of the same size comprises generating pixel maps from two data sets of different spatial resolutions. For example, measurements of agronomic yield values may have a spatial resolution of ten meters by ten meters while a satellite image may contain pixels of a spatial resolution of five meters by five meters. Before generating a difference metric between the image and the pixel maps, agricultural intelligence computer system 130 may aggregate the different values to the same resolution.

Figure 9:
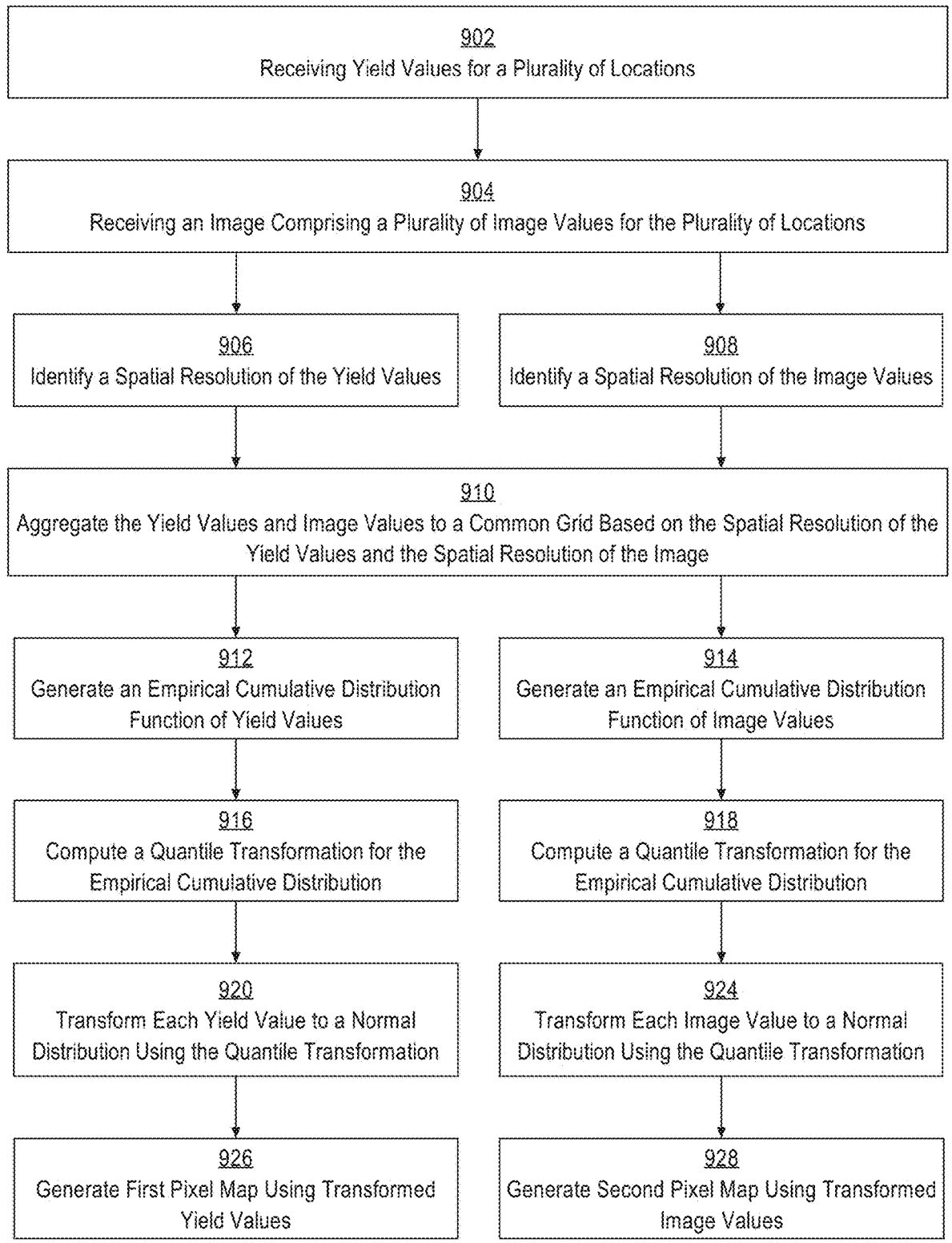
FIG. 9 is a flow diagram that depicts a method of using two data sets of different resolutions to generate two pixel maps of the same resolution.

FIG. 9 is a flow diagram that depicts a method of using two data sets of different resolutions to generate two pixel maps of the same resolution. While the method depicted in FIG. 9 describes using yield values and an image, the method of FIG. 9 may be used with different types of values, such as other physical properties of the field.

At step 902, yield values are received for a plurality of locations. For example, agricultural intelligence computer system 130 may provide a user interface to field manager computing device 104 for entering measured yield values after harvest of a particular crop. Additionally and/or alternatively, agricultural apparatus 111 may be a harvester communicatively coupled to remote sensor 112 which measures agronomic yield at a particular location and sends the measured yield values to agricultural intelligence computer system 130. In some embodiments, the yield values correspond to predicted yield for a particular location. For example, a yield model may predict total yield for a field location based on one or more properties such as past yield, relative maturity of a particular seed type, nutrient content, moisture content, temperature, pH, and the like.

At step 904, an image comprising a plurality of image values are received for a plurality of locations. For example, remote sensor 112 may comprise one or more unmanned aerial vehicles (UAVs) and/or satellites comprising cameras configured to produce images using ultraviolet, visible light, near infrared, and/or infrared wavelengths. Images produced using remote sensor 112 may comprise a plurality of pixels, each with a pixel value corresponding to the displayed pixel. Each pixel also corresponds to a physical area, such as a portion of a field.

At step 906, a spatial resolution of the yield values is identified. At step 908, a spatial resolution of the image values is identified. The spatial resolutions for the yield values and image values may be dictated by the received data. For example, agricultural intelligence computer system 130 may model predicted yield at a particular resolution because nutrient samples in soil are only available at the particular resolution. The resolution of the image values may be dependent on remote sensor 112. Thus, a first satellite may be capable of producing an image with pixels that correspond to locations on the field that are five meters by five meters while a second satellite is only capable of producing an image with pixels that correspond to locations on the field that are twenty meters by twenty meters.

At step 910, the yield values and image values are aggregated to a common grid based on the spatial resolution of the yield values and the spatial resolution of the image. The common grid may be selected based on the lower of the two spatial resolutions. For example, if a first spatial resolution is at 5 meters by 5 meters and a second spatial resolution is at 10 meters by 10 meters, the first data values may be averaged for each set of four pixels to generate a single pixel with a spatial resolution of 10 meters. The common grid may also be selected based on the higher of the two spatial resolutions. For instance, in the above example, the second data values may each be split into four copies to generate four pixels with a spatial resolution of 5 meters.

In an embodiment, the common grid is selected based on both spatial resolutions. For example, if a first spatial resolution is seven meters squared and a second spatial resolution is eight meters squared, the pixel map of the second spatial resolution may be interpolated onto a grid of the size of the first spatial resolution. Thus, the eight meters squared pixels may be interpolated to a grid of pixels of seven meters squared. Additionally and/or alternatively, each pixel map may be broken into smaller pixel maps. Thus, in the above example, each map may be generated using a grid with a spatial resolution of one meter by breaking pixels with a spatial resolution of seven meters into forty nine pixels with the same pixel value and breaking the pixels with a spatial resolution of eight meters into sixty four pixels with the same pixel value.

In an embodiment, aggregating the pixels to a common grid comprises interpolating values at particular pixels. For example, if a spatial resolution of seven meters is broken up into multiple pixels with a spatial resolution of one meter, the pixels on the edges of each broken up set of pixels may have a sharp contrast to the neighboring pixels. Thus, pixel values at the edges of a broken up set of pixels may comprise average and/or weighted average values of the initial pixel and the neighboring pixel or pixels. In an embodiment, agricultural intelligence computer system 130 uses more complex methods for interpolating values to a common grid. For example, interpolating values to the common grid may comprise selecting values using a piecewise cubic, continuously differentiable, and approximately curvature-minimizing polynomial surface.

At step 912, an empirical distribution function of yield values is generated. At step 914, an empirical cumulative distribution function of image values is generated. The empirical distribution function is generated using the received data in order to estimate the underlying cumulative distribution function which is assumed to be the source of the data values. Thus, for a series of values describing agronomic yield at a plurality of locations, the empirical distribution function would be some function that outputs the agronomic yield values with an input of the location values.

At steps 916, 918, a quantile transformation is computed for the empirical cumulative distribution functions generated in steps 912, 914 respectively. A quantile transformation is a function dependent on a probability variable which outputs the input value at which the probability of receiving the input value from a particular distribution is less than or equal to the probability variable. For example, the empirical distribution function of yield values describes likely yield values at each location. At a particular location, the quantile transformation for the empirical distribution functions would convert the absolute yield values to relative yield values which describe the yield at a particular location in the field relative to other locations in the field. Thus, if the output value of the quantile distribution for a particular location indicates the fiftieth percentile, the yield value at the particular location would be the median value of the entire field.

By generating the quantile transformation from the empirical cumulative distribution functions, agricultural intelligence computer system 130 essentially normalizes the initial values. For example, yield values for a first year may be on average much greater than yield values from a second year due to varying weather conditions. In order to preserve spatial relationships in the computation of similarity scores, agricultural intelligence computer system 130 is programmed to generate the quantile transformation so that each output value is between zero and one. This allows agricultural intelligence computer system 130 to determine similarities in patterns between various years while reducing the effects of uniform shifts of values, such as due to weather conditions.

At step 920, each yield value is transformed to a normal distribution using the quantile transformation. At step 924, each image value is transformed to a normal distribution using the quantile transformation. For example, for each value $x_i$ of X, agricultural intelligence computer system 130 may be programmed to transform the value from the Quantile Transformation to a normal distribution using the following equation:

$$z_i = Q^{-1}(p_i)$$

where $z_i$ is the value transformed into a normal distribution, $Q^{-1}$ is the inverse of the standard normal distribution, and $p_i$ is the probability value which is equal to the value of the empirical cumulative distribution function at the value $x_i$.

By transforming the values from the cumulative distribution to the normal distribution, agricultural intelligence computer system 130 increases the efficiency of the ability of agricultural intelligence computer system 130 to compare the image data with the yield data. For example, modeling variables between a range of [0,1] requires extensive computing power due to the absence of parallel values, or normality. By transforming the values to be between the ranges of [−∞, ∞], agricultural intelligence computer system 130 is able to more efficiently compute a comparison between different types of values. Thus, agricultural intelligence computer system 130 is able to expend less resources when modeling changes within a field and/or generating agronomic models based on the pixel maps.

At step 926 a first pixel map is generated using transformed yield values. At step 928 a second pixel map is generated using transformed image values. The pixel maps, in this context, refer to digitally stored data that can be interpreted or used as the basis of generating a graphical image of a geographical area on a computer display. As the method described herein converts each value to some value between [−∞, ∞] each map may be generated by assigning a color and/or shade to each value between [−∞, ∞]. For example, the color red may be assigned to a pixel with a value approaching −∞, the color green assigned to a pixel with a value approaching ∞, and different shades ranging from red to green assigned to values between [−∞, ∞] respectively.

As each set of data is converted into a pixel map with values between [−∞, ∞], different types of data with different data ranges may be compared using this method. Thus, while yield values may comprise a separate range than color values of satellite imagery, the two data sets may be compared to identify spatial patterns by converting them into maps using the methods described herein.

Using the methods described herein, agricultural intelligence computer system 130 is programmed to use data that does not initially have a correspondence to a particular image to generate a pixel map which can be compared to other data or to images as described above. By using location values along with measurements at each location to generate a pixel map, agricultural intelligence computer system 130 is programmed to generate a new method of comparing non-image data using image comparison techniques. Thus, the methods described herein improve on existing methods for comparing locational data, such as comparisons of predictions with results, by generating pixel maps which can be treated as images for the purpose of performing comparisons. These pixel maps may also be used to generate two dimensional images of a particular value in a particular location, such as by assigning shading or color detail to particular ranges of pixel values.

3.4. Difference Metrics

Referring again to FIG. 8, at step 806, a first vector of values is generated from the first pixel map. At step 808 a second vector of values is generated from the second pixel map. Agricultural intelligence computer system 130 may flatten the pixel maps into one dimensional vectors. For example, locations in the pixel map may be ordered, such as sequentially by row. Thus, a vector of values may comprise pixel values corresponding to a top row of pixels followed by pixel values corresponding to a second row of pixels and so on. As both pixel maps are of the same size, pixel values in each vector will correspond to each other as long as the same method for generating the vector of values is used for both pixel maps.

At step 810, a matrix of metric coefficients is generated wherein each row of the matrix corresponds to a first pixel location of the first pixel map, each column of the matrix of metric coefficients corresponds to a second pixel location of the first pixel map, and each value in the matrix is computed using a spatial distance between the first pixel location and the second pixel location. For example, each pixel map comprises a plurality of pixel values at particular coordinates. The coordinates may be in latitude and longitude, the universal transverse Mercator coordinate system, or a simple two-dimensional grid system which may later be translated into a physically appropriate coordinate system.

Agricultural intelligence computer system 130 may compute each value in the matrix based on the spatial distance between two pixels ($P_i$ and $P_j$). For example, a matrix G may be a two dimensional Gaussian function with an assumed spatial dependency that decreases exponentially, such that each element of G is computed as:

$$g_{ij} = \frac{1}{2\pi\sigma^2} e^{\frac{-\|P_i, P_j\|_2^2}{2\sigma^2}}$$

where $\|P_i, P_j\|_2^2$ is the squared distance between the two pixels in the Euclidean space and $\sigma^{-2}$ is the variance of the Gaussian function. The variance $\sigma^2$ is configurable in order to increase or decrease the amount of detail in the difference metric. For example, a high $\sigma^2$ would reduce each value in the matrix, thereby decreasing the effect of the spatial relationships on the difference metric.

At step 812, a difference metric identifying a difference between the first pixel map and the second pixel map is generated based on the first vector of values, the second vector of values, and the matrix of metric coefficients. For example, using the matrix of metric coefficients above to preserve the spatial relationships between pixels, agricultural intelligence computer system 130 is programmed to compute a difference metric. An example equation for computing the difference metric is as follows:

$$VM(x,y) = (x-y)^T G(x-y)$$

where x and y are the two pixel maps flattened into vectors and G is a matrix of metric coefficients. By using the matrix of metric coefficients in the computation of the difference metric, agricultural intelligence computer system 130 is able to take near-by pixels into consideration. Thus, spatial patterns of yield maps and images may be preserved. It should be noted that a difference metric closer to zero, as computed using the above metric, indicates high correlation between the two pixel maps.

3.5. Normalized Difference Metrics

At step 814, a normalized difference metric comprising a quotient of the difference metric with a sum of the metric coefficient in the matrix of metric coefficients is computed from the difference metric. Steps 802-812 produce a difference metric between two maps of equivalent size. The difference metric computed in step 812 may be computed for a plurality of pixel maps, thereby allowing agricultural intelligence computer system 130 to determine comparisons for different maps in different locations. While pixel maps of the same size and shape will produce the same range of results for a difference metric, pixel maps of increasing size will produce increasing difference metrics.

In order to produce a similarity metric which can be used on fields of various sizes and shapes, agricultural intelligence computer system 130 is programmed to compute a normalized difference metric from the difference metric computed in step 812. Computing the normalized difference metric may comprise dividing the difference metric by the sum of the values in the matrix of metric coefficients. For example, a comparison between two vectors of values may be normalized by dividing it by a comparison between the zero vector and the one vector of the same size:

$$CS_{norm}(x, y) = \frac{CS(x, y)}{CS(\vec{1}, \vec{0})} = \frac{CS(x, y)}{\vec{1}^T G \vec{1}} = \frac{CS(x, y)}{\sum_{i,j}^{n} g_{i,j}}.$$

By generating a normalized difference metric, agricultural intelligence computer system 130 produces a metric which can be applied to different types and sizes of pixel maps. This allows agricultural intelligence computer system 130 to update prediction estimates, select satellite images to use for crop modeling, determine yield consistency, select management zones, determine relationships for particular fields, and produce alerts to investigate management practices using a uniform metric. For example, a plurality of normalized difference metrics may be used to determine an average value for yield consistency. If two pixel maps of yield values for a particular field produces a score that is significantly lower than the average value, agricultural intelligence computer system 130 may identify changes in management practices that led to inconsistent yield values.

3.6. Difference Metric Usage

The methods described above may be to generate difference metrics that factor in spatial relationships for a plurality of pixel maps. Agricultural intelligence computer system 130 may utilize difference metrics to select images from a plurality of images of a location, to generate recommendations, and/or to generate instructions for an application controller on one or more fields. Additionally, agricultural intelligence computer system 130 may be programmed to produce overall analytics for all fields and/or analytics for a particular field or region.

3.6.1. SELECTING IMAGES

In an embodiment, the difference metrics are used to select one of a plurality of digital images of a particular field. For example, agricultural intelligence computer system 130 may receive a plurality of images of a particular field. Agricultural intelligence computer system 130 may perform the method described above in order to compute difference metrics describing difference between each image and a pixel map of values from the field, such as yield values. Agricultural intelligence computer system 130 is programmed to select an image from the plurality of images with the highest difference metric when compared to the pixel map of values from the field.

The plurality of images may be received from a plurality of sources, such as one or more satellite images from various satellites, or from a single source, such as a plurality of images from a single satellite. The plurality of images may also be produced using a plurality of wavelengths of light. For example, a first image may be produced using near infrared frequencies while a second satellite image may be produced using visible spectrum light. Additionally and/or alternatively, the plurality of images may include images of a field at different dates. For example, if agricultural intelligence computer system 130 received three images of a field throughout the growth of a particular crop, the method described above may be performed with respect to each of the three images.

By comparing a plurality of images with a pixel map of values from the field, agricultural intelligence computer system 130 may identify images that are highly correlated to the values from the field. For example, satellite images in the near infrared spectrum may be correlated to nitrogen levels of a crop which may be correlated to yield values. If satellite images are received in different spectra, agricultural intelligence computer system 130 may identify the spectra that has the highest correlation to the yield values. Additionally and/or alternatively, if satellite images are received at different times in the development cycle of a crop, agricultural intelligence computer system 130 may use the difference metrics to determine which time in the development cycle of the crop produces images which are more highly correlated to the yield values.

In an embodiment, agricultural intelligence computer system 130 uses the selected images to create a digital model of crop yield based. For example, a crop yield model may be produced which estimates yield of a crop based on images of the crop at a particular point of development as determined by difference metrics between images taken at different times during a crop's development. The crop yield model may be generated using yield value data for a plurality of fields and image data at the particular point of development for the plurality of fields.

In an embodiment, the selected image is used to identify management zones. For example, measured yield values are generally more accurate in terms of crop yield than satellite images, but satellite images of a field may be available at a finer resolution than the measured yield values. Thus agricultural intelligence computer system 130 may select a satellite image that, when compared to measured yield values at a common grid, produces the highest difference metric. The selected image may then be used to separate the field into management zones. For example, agricultural intelligence computer system 130 may identify regions within the selected image that contain uniform yield values to identify as management zones.

Management zones, as described herein, refer to contiguous sub-regions of a field with a relatively homogenous combination of yield limiting factors, such that the optimal rate of a specific crop input or management practice may be reasonably uniform within the region. For example, different areas of a field may be affected differently by soil moisture, nutrient application, and/or planting techniques due to variances in soil type, location, elevation, and/or a variety of other factors. Each field may be divided into management zones wherein each zone is associated with its own management practices. For example, a first management zone may be generated for a field that is less responsive to nitrate application while a second management zone may be generated for a portion of the field that is more sensitive to nitrate application. Selected images for a field may be used to divide the field into different zones based on groupings of values. For example, if a particular portion of the field has uniformly higher yield values than the remainder of the field, the particular portion of the field may be identified as a management zone. Selecting management zones using difference metrics is described further herein.

3.6.2. Comparisons to Measured Yield

In an embodiment, agricultural intelligence computer system 130 is programmed to use difference metrics to determine accuracies of predictions of a crop. For example, the first yield map may be generated from modeled yield values while the second yield map is generated from measured yield maps. Agricultural intelligence computer system 130 may compute the difference metric described above in order to determine whether a prediction of crop yield conformed to similar spatial patterns as a measured crop yield.

By taking into account the spatial patterns, agricultural intelligence computer system 130 may better identify prediction estimate errors. For example, if the difference metric is low, but the predictions are off by a uniform amount, agricultural intelligence computer system 130 may determine that the model has a uniform error or that one or more parameters are not being modeled which affect the entire field. Alternatively, if the difference metric is high, then agricultural intelligence computer system 130 may determine that the model contains non-uniform errors. For example, the model may be failing to capture variations in soil types within the field.

In an embodiment, agricultural intelligence computer system 130 uses the difference metrics to identify relationships between particular field values. For example, agricultural intelligence computer system 130 may receive a first pixel map of values relating to a property of the field at a specific time, such as pH value or nitrogen in soil before side dressing, and a second pixel map of values for measured total yield. Agricultural intelligence computer system 130 may then determine a correlation between the property of the field at the specific time and the measured yield using the difference metric. For example, a low difference metric may be associated with a high correlation between the property and the yield.

Agricultural intelligence computer system 130 may generate difference metrics for a plurality of properties in comparison to yield for a particular location. In doing so, agricultural intelligence computer system 130 may determine, for the particular location, which properties are most highly correlated with the agronomic yield. For example, field manager computing device 104 may send digital data to agricultural intelligence computer system 130 comprising a plurality of values of measured agronomic yield and a plurality of values of each of a plurality of field related properties, such as moisture content, nutrient content, pH, and/or temperature. Additionally and/or alternatively, agronomic yield values and field property values may be provided by one or more remote sensors 112. Agricultural intelligence computer system 130 may then compute difference metrics for each property in relationship to the agronomic yield in order to identify properties that have a higher correlation to the yield for the particular location.

Agricultural intelligence computer system 130 may also perform aggregate comparisons to determine which properties are generally correlated with yield. For example, agricultural intelligence computer system 130 may receive values of specific properties coupled with values of agronomic yield for a plurality of fields. The plurality of fields may include all fields that provide data to agricultural intelligence computer system 130 or a subset of said fields. For example, available field data may be broken up into different geographical regions, such as counties. Agricultural intelligence computer system 130 may determine average difference metrics for the county in order to identify property values for the county that are highly correlated to the agronomic yield.

3.6.3. Selecting Models

In an embodiment, agricultural intelligence computer system 130 is programmed to use the difference metrics to select particular agronomic models. Agricultural intelligence computer system 130 may generate multiple models of agronomic yield for a particular field, such as by perturbing particular parameters and/or inputs. For example, models of agronomic yield may be based on particular input values and/or parameters which are used to compute yield based on the input values. Each value and/or parameter may be associated with a particular uncertainty.

Agricultural intelligence computer system 130 may compute the model for agronomic yield multiple times using different values and/or parameters based on the uncertainties. Agricultural intelligence computer system 130 may compute difference metrics between predicted yields from the models and the measured agronomic yield. Agricultural intelligence computer system 130 may identify the lowest difference metric of the computed difference metrics and select the corresponding model of agronomic yield. The values and/or parameters for the selected model may be used to generate future models of agronomic yield and/or to correct errors within the model of agronomic yield.

3.6.4. Yield Consistency

In an embodiment, agricultural intelligence computer system 130 is programmed to use difference metrics to determine consistency within a particular field. For example, agricultural intelligence computer system 130 may compute difference metrics for the measured yields of a particular field and over a plurality of years. Based on the difference metrics for the particular field over a plurality of years, agricultural intelligence computer system 130 may determine how consistent the spatial patterns within a particular field are over a plurality of years.

In an embodiment, agricultural intelligence computer system 130 computes the yield consistency for a particular region based on a plurality of yield maps from a plurality of years. For example, agricultural intelligence computer system 130 may compute the yield consistency as a deviation from an average yield map:

$$YC = \frac{\sum_{i=0}^{m} VM(x_i, x_{mean})}{m}$$

where YC is the yield consistency, $x_{mean}$ is an average yield map generated by averaging yield values at each location within a particular field, and m is the total number of available yield maps. As the yield consistency computed above approaches zero, the yield is determined to be more consistent in the pixel maps. As another example, agricultural intelligence computer system 130 may compute the yield consistency as a sum of comparisons between each set of two pixel maps:

$$YC = \frac{\sum_{i=1}^{m-1} \sum_{j=i+1}^{m} VM(x_i, x_j)}{\frac{1}{2}m(m-1)}$$

where $x_i$ and $x_j$ are pixel maps of yield values from different years. As an additional example, agricultural intelligence computer system 130 may just select the maximum difference metric between maps to use as the yield consistency.

Yield consistencies may be computed for full fields and/or for particular sections of the fields. For example, agricultural intelligence computer system 130 may compute yield consistencies for each identified management zone of a particular field. Based on the yield consistencies for each management zone, agricultural intelligence computer system 130 may update the delineation of management zones and/or recommend different management practices for one or more management zones. For example, a management zone which shows inconsistent yields may be more affected by additional factors, such as differences in soil composition, temperature, elevation, etc. Agricultural intelligence computer system 130 may identify factors that affect the yield for an inconsistent management zone, such as by comparing field values with yield values for the particular field using the difference metrics, and generate recommendations and/or management practices based on the identified factors.

3.6.5. Recommendations and Application Controller Instructions

Referring to FIG. 8, at step 816, one or more field management recommendations are generated and sent to a field manager computing device based, at least in part, on the particular normalized difference metric.

Based on the above computed difference metrics and/or consistency scores, agricultural intelligence computer system 130 may be programmed to generate recommendations and/or instructions for an application controller. Recommendations may include digital data sent to field manager computing device 104 which identify one or more management practices. Instructions for an application controller may include digitally programmable instructions or scripts which, when sent to the application controller, cause the application controller to control an operating parameter of an agricultural vehicle or implement. For example, an application controller may be communicatively coupled to a farm implement, such as a watering valve. The application controller may execute a particular script to cause the watering valve to release water on one or more portions of a field.

In an embodiment, agricultural intelligence computer system 130 generates recommendations and/or instructions for an application controller based on comparisons between field values and total yield. For example, agricultural intelligence computer system 130 may receive field values such as temperature, moisture content, pH, seed type, and nutrient values in the soil during the growth cycle of a crop on one or more fields. Agricultural intelligence computer system 130 may also receive yield values for the crop on the one or more fields. Based on comparisons between the field values and the yield values, agricultural intelligence computer system 130 may identify one or more field values that have higher correlations to yield values. Agricultural intelligence computer system 130 may generate recommendations based on the identified field values. For example, if agricultural intelligence computer system 130 determines that nutrient levels at a particular stage of development is highly correlated to yield, agricultural intelligence computer system 130 may recommend increasing the nutrient levels at the particular stage of development.

In an embodiment, agricultural intelligence computer system 130 uses comparisons of a plurality of fields to make recommendations. For example, the first time a field manager computing device requests recommendations, agricultural intelligence computer system 130 may send recommendations generated for a particular region, such as recommendations based on field values in the same county. Additionally and/or alternatively, agricultural intelligence computer system 130 may personalize recommendations based on field values for a particular field. For example, while agricultural intelligence computer system 130 may determine that fields in a particular county have a low correlation between added nutrients and yield, difference metrics for a particular field over a plurality of years may show a high correlation between added nutrients and yield due to different soil compositions. Thus, while based on aggregate county data agricultural intelligence computer system 130 may not send a recommendation for adding nutrients to the soil, based on past field data for the particular field agricultural intelligence computer system 130 would recommend adding nutrients to the soil.

In an embodiment, agricultural intelligence computer system 130 further personalizes recommendations based on identified management zones. For example, agricultural intelligence computer system 130 may perform comparisons between field values and yield values for a particular field. Additionally, agricultural intelligence computer system 130 may perform comparisons for each management zone within the field. In cases where difference metrics show a high correlation for the entire field, agricultural intelligence computer system 130 may recommend a uniform management practice based on the difference metric. For cases where difference metrics for some management zones are high while for other management zones are low, agricultural intelligence computer system 130 may recommend management practices individually for one or more management zones of the field.

3.6.6. Selecting Management Zones

In an embodiment, agricultural intelligence computer system 130 is programmed to use difference metrics and/or yield consistency scores to generate management zones and/or to select management zones. For example, agricultural intelligence computer system 130 may identify management zones based on yield values over a plurality of years, field characteristics such as soil and topographical properties, or a combination thereof.

In an embodiment, agricultural intelligence computer system 130 uses difference metrics to validate particular management zones. For each generated management zone, agricultural intelligence computer system 130 may compute a difference metric and/or yield consistency score based on yield values for a plurality of years. Agricultural intelligence computer system 130 may select a particular management zone as a "bad" management zone or a "good" management zone. For example, agricultural intelligence computer system 130 may store a threshold value indicating a maximum variation between a management zone and an overall field. If the yield consistency score and/or the difference metric for a particular management zone is more than the threshold value greater than the yield consistency score and/or the difference metric for the entire field, agricultural intelligence computer system 130 may determine that the particular management zone is a "bad" management zone as it contains more difference from year to year than the field overall. A "bad" management zone may be removed as its own management zone and/or be subject to management treatments that are generated for the field as a whole.

Additionally, good/bad management zones may be identified based on comparisons between different factors. For example, a first management zone may have a low difference metric in a comparison between moisture content and yield, but a higher difference metric in a comparison between yield and other factors. A second management zone may have a high difference metric in a comparison between moisture content and yield, but a low difference metric in a comparison between nutrient content and yield. The first management zone may be identified as a "good" management zone for moisture content, but a "bad" management zone for other factors. Conversely, the second management zone may be identified as a "bad" management zone for moisture content, but a "good" management zone for nutrient content.

3.6.7. Investigate Management Practices

In an embodiment, agricultural intelligence computer system 130 uses difference metrics and/or yield consistency scores to determine whether to investigate management practices. For example, agricultural intelligence computer system 130 may generate average difference metrics and/or yield consistency scores for fields within a particular region, such as a county. Agricultural intelligence computer system 130 may also generate difference metrics and/or yield consistency scores for a particular field within the particular regions. Agricultural intelligence computer system 130 may compare the difference metrics and/or yield consistency scores within the particular field to the average difference metrics and/or yield consistency scores for the region. If agricultural intelligence computer system 130 detects that the scores for the particular field are more than a threshold value greater than the average scores for the county, agricultural intelligence computer system 130 may send a notification to a field manager computing device associated with the particular field to investigate the management practices of the field.

Additionally and/or alternatively, agricultural intelligence computer system 130 may investigate management practices of a field in response to determining that the particular field exhibits more variability than the average of the fields in the county. Investigating management practices may comprise identifying variability in input values and/or parameters. For example, field manager computing device 104 may send data to agricultural intelligence computer system 130 identifying management practices for a particular field, such as tillage methods, nutrient application, water application, etc. Agricultural intelligence computer system 130 may identify variations in the identified management practices to determine causes of variability within the particular field. Based on identified management practices and whether the yield increased or decreased during times of the management practices, agricultural intelligence computer system 130 may generate recommendations for future management practices.

4. Benefits of Certain Embodiments

Using the techniques described herein, a computer can generate pixel map images from non-image data, such as field values and/or yield values, and compare the generated pixel maps to each other using image comparison techniques. Additionally, the techniques described herein provide a method for comparing non-image data of a particular location to image data of the location. Using these methods, a computing system may select a best image based on comparisons between the image and measured values. The techniques described herein also provide a means for generating metrics that are scalable to images of varying sizes, thereby allowing a metric comparing a first two images to be compared against a metric comparing a second two images of a different size and/or shape. The functioning of the computing device may be improved due to the improved image comparison techniques and improved selected images.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computing device comprising:
   one or more processors;
   a memory storing instructions which, when executed by the one or more processors, cause the one or more processors to cause performance of:
   obtaining a first pixel map for a first physical property at a plurality of locations in a particular region;
   obtaining a second pixel map for a second physical property at the plurality of locations in the particular region, wherein the second pixel map is an equal size as the first pixel map;
   generating, from the first pixel map, a first vector of values;
   generating, from the second pixel map, a second vector of values;
   computing a difference metric identifying a difference between the first pixel map and the second pixel map based, at least in part, on the first vector of values and the second vector of values, the difference metric relating to a mathematical difference between the first vector of values and the second vector of values.

2. The computing device of claim 1, wherein obtaining the first pixel map comprises:
   receiving first digital data comprising a plurality of values corresponding to the first physical property at the plurality of locations within the particular region;
   generating, from the first digital data, the first pixel map for the first physical property at the plurality of locations within the particular region.

3. The computing device of claim 1, wherein the first physical property at the plurality of locations within the particular region comprises measurements of a particular attribute of a particular agricultural field.

4. The computing device of claim 1,
   wherein the first physical property is different than the second physical property;
   wherein the instructions, when executed by the one or more processors, further cause performance of:
   computing, for each value of the first vector of values, a normalized value based, at least in part, on a distribution of values in the first vector of values;
   computing, for each value of the second vector of values, a normalized value based, at least in part, on a distribution of values in the second vector of values;
   using the normalized values of the first vector of values and the second vector of values, constructing a first normalized vector of values and a second normalized vector of values;
   generating the difference metric based, at least in part, on the first normalized vector of values and the second normalized vector of values.

5. The computing device of claim 4,
   wherein the first physical property is a crop yield value for each location of the plurality of locations;
   wherein the particular region is a particular field;
   wherein the second physical property is a physical attribute of the particular field other than a crop yield value.

6. The computing device of claim 1,
wherein the first physical property represents predictions of total yield for each location of the plurality of locations;
wherein the second physical property represents measured crop yield values for each location of the plurality of locations;
wherein the instructions, when executed by the one or more processors, further cause performance of:
determining an accuracy of predictions of total yield based, at least in part, on the difference metric.

7. The computing device of claim 1, wherein the instructions, when executed by the one or more processors, further cause performance of:
obtaining a third pixel map for a third physical property at the plurality of locations within the particular region, wherein the third pixel map is an equal size as the first pixel map;
generating, from the third pixel map, a third vector of values;
generating a difference metric identifying a difference between the second pixel map and the third pixel map based, at least in part, on the second vector of values and the third vector of values;
computing a consistency value identifying a consistency of a particular physical property at the plurality of locations based, at least in part, on the difference metric identifying a difference between the first pixel map and the second pixel map and the difference metric identifying a difference between the second pixel map and the third pixel map.

8. The computing device of claim 1, wherein the instructions, when executed by the one or more processors, further cause performance of:
receiving second digital data comprising a plurality of values corresponding to the first physical property at a subset of the plurality of locations within the particular region;
generating, from the second digital data, a third pixel map for the first physical property at the subset of the plurality of locations within the particular region;
obtaining a fourth pixel map for the second physical property at the subset of the plurality of locations within the particular region, wherein the fourth pixel map is an equal size as the third pixel map;
generating, from the third pixel map, a third vector of values;
generating, from the fourth pixel map, a fourth vector of values;
generating a difference metric identifying a difference between the third pixel map and the fourth pixel map based, at least in part, on the third vector of values and the fourth vector of values;
storing a threshold difference value;
determining that the difference metric identifying the difference between the third digital data and the fourth pixel map is a higher than the difference metric identifying the difference between the first pixel map and the fourth pixel map by at least the threshold difference value;
in response to the determining, identifying the subset of the plurality of locations as a "bad" subset.

9. The computing device of claim 1, wherein the second pixel map is a satellite image of a particular field within the particular region.

10. The computing device of claim 1, wherein obtaining the first pixel map and the second pixel map comprises:
receiving first digital data comprising a first set of values for a plurality of locations;
receiving second digital data comprising a second set of values for the plurality of locations;
identifying a first spatial resolution of the first set of values;
identifying a second spatial resolution of the set of values;
aggregating the first set of values and the second set of values to a common grid based, at least in part, on the first spatial resolution and the second spatial resolution;
generating the first pixel map using the aggregated first set of values;
generating the second pixel map using the aggregated second set of values.

11. The computing device of claim 10,
wherein the first set of values comprise agronomic values of a crop for a plurality of locations;
wherein the second set of values comprise image values of an image of the plurality of locations.

12. A method comprising:
obtaining a first pixel map for a first physical property at a plurality of locations in a particular region;
obtaining a second pixel map for a second physical property at the plurality of locations in the particular region, wherein the second pixel map is an equal size as the first pixel map;
generating, from the first pixel map, a first vector of values;
generating, from the second pixel map, a second vector of values;
computing a difference metric identifying a difference between the first pixel map and the second pixel map based, at least in part, on the first vector of values and the second vector of values, the difference metric relating to a mathematical difference between the first vector of values and the second vector of values.

13. The method of claim 12, wherein obtaining the first pixel map comprises:
receiving first digital data comprising a plurality of values corresponding to the first physical property at the plurality of locations within the particular region;
generating, from the first digital data, the first pixel map for the first physical property at the plurality of locations within the particular region.

14. The method of claim 12, wherein the first physical property at the plurality of locations within the particular region comprises measurements of a particular attribute of a particular agricultural field.

15. The method of claim 12, further comprising:
wherein the first physical property is different than the second physical property;
computing, for each value of the first vector of values, a normalized value based, at least in part, on a distribution of values in the first vector of values;
computing, for each value of the second vector of values, a normalized value based, at least in part, on a distribution of values in the second vector of values;
using the normalized values of the first vector of values and the second vector of values, constructing a first normalized vector of values and a second normalized vector of values;
generating the difference metric based, at least in part, on the first normalized vector of values and the second normalized vector of values.

16. The method of claim 15,
wherein the first physical property is a crop yield value for each location of the plurality of locations;

wherein the particular region is a particular field;

wherein the second physical property is a physical attribute of the particular field other than a crop yield value.

17. The method of claim 12, further comprising:

wherein the first physical property represents predictions of total yield for each location of the plurality of locations;

wherein the second physical property represents measured crop yield values for each location of the plurality of locations;

determining an accuracy of predictions of total yield based, at least in part, on the difference metric.

18. The method of claim 12, further comprising:

obtaining a third pixel map for a third physical property at the plurality of locations within the particular region, wherein the third pixel map is an equal size as the first pixel map;

generating, from the third pixel map, a third vector of values;

generating a difference metric identifying a difference between the second pixel map and the third pixel map based, at least in part, on the second vector of values and the third vector of values;

computing a consistency value identifying a consistency of a particular physical property at the plurality of locations based, at least in part, on the difference metric identifying a difference between the first pixel map and the second pixel map and the difference metric identifying a difference between the second pixel map and the third pixel map.

19. The method of claim 12, further comprising:

receiving second digital data comprising a plurality of values corresponding to the first physical property at a subset of the plurality of locations within the particular region;

generating, from the second digital data, a third pixel map for the first physical property at the subset of the plurality of locations within the particular region;

obtaining a fourth pixel map for the second physical property at the subset of the plurality of locations within the particular region, wherein the fourth pixel map is an equal size as the third pixel map;

generating, from the third pixel map, a third vector of values;

generating, from the fourth pixel map, a fourth vector of values;

generating a difference metric identifying a difference between the third pixel map and the fourth pixel map based, at least in part, on the third vector of values and the fourth vector of values;

storing a threshold difference value;

determining that the difference metric identifying the difference between the third digital data and the fourth pixel map is a higher than the difference metric identifying the difference between the first pixel map and the fourth pixel map by at least the threshold difference value;

in response to the determining, identifying the subset of the plurality of locations as a "bad" subset.

20. The method of claim 12 wherein the second pixel map is a satellite image of a particular field within the particular region.

21. The method of claim 12, wherein obtaining the first pixel map and the second pixel map comprises:

receiving first digital data comprising a first set of values for a plurality of locations;

receiving second digital data comprising a second set of values for the plurality of locations;

identifying a first spatial resolution of the first set of values;

identifying a second spatial resolution of the set of values;

aggregating the first set of values and the second set of values to a common grid based, at least in part, on the first spatial resolution and the second spatial resolution;

generating the first pixel map using the aggregated first set of values;

generating the second pixel map using the aggregated second set of values.

22. The method of claim 21, wherein the first set of values comprise agronomic values of a crop for a plurality of locations;

wherein the second set of values comprise image values of an image of the plurality of locations.

* * * * *